United States Patent
Park et al.

(10) Patent No.: US 8,223,305 B2
(45) Date of Patent: Jul. 17, 2012

(54) DISPLAY DEVICE

(75) Inventors: Hong-jo Park, Suwon-si (KR);
Hyeok-jin Lee, Seongnam-si (KR);
Sung-jae Yun, Yongin-si (KR);
Hee-seop Kim, Hwaseong-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 438 days.

(21) Appl. No.: 12/185,865

(22) Filed: Aug. 5, 2008

(65) Prior Publication Data

US 2009/0153761 A1 Jun. 18, 2009

(30) Foreign Application Priority Data

Dec. 14, 2007 (KR) .................. 10-2007-0131244

(51) Int. Cl.
*G02F 1/1333* (2006.01)
*G02F 1/1343* (2006.01)

(52) U.S. Cl. ......... 349/129; 349/141; 345/173; 345/176

(58) Field of Classification Search .............. 349/86–88, 349/141, 129–130; 345/173, 176
See application file for complete search history.

(56) References Cited

U.S. PATENT DOCUMENTS

| 7,250,996 | B2* | 7/2007 | Yoshida et al. | 349/114 |
| 2002/0171800 | A1* | 11/2002 | Miyazaki et al. | 349/156 |
| 2003/0202145 | A1* | 10/2003 | Takizawa et al. | 349/129 |
| 2005/0179847 | A1* | 8/2005 | Miyachi et al. | 349/141 |
| 2005/0237472 | A1* | 10/2005 | Shibahara et al. | 349/167 |
| 2009/0213285 | A1* | 8/2009 | Yun et al. | 349/33 |
| 2009/0219478 | A1* | 9/2009 | Park et al. | 349/155 |
| 2010/0141859 | A1* | 6/2010 | Park et al. | 349/39 |

FOREIGN PATENT DOCUMENTS

| JP | 05241133 | 9/1993 |
| JP | 11237619 | 8/1999 |
| JP | 2005070076 | 3/2005 |
| JP | 2005189434 | 7/2005 |
| JP | 2005215339 | 8/2005 |
| JP | 2005300779 | 10/2005 |
| JP | 2007086205 | 5/2007 |
| JP | 2007171938 | 7/2007 |

\* cited by examiner

*Primary Examiner* — Brian M. Healy
*Assistant Examiner* — Mary El Shammaa
(74) *Attorney, Agent, or Firm* — F. Chau & Associates, LLC

(57) ABSTRACT

A display device includes a first substrate, a second substrate which is disposed to face the first substrate, a liquid crystal layer which is disposed between the first substrate and the second substrate, a first electrode and a second electrode which are formed on the first substrate, and a protrusion which is disposed under one of the first electrode and the second electrode, the liquid crystal layer having an isotropic state when there is no applied electric field, and an anisotropic state when an electric field is applied.

26 Claims, 8 Drawing Sheets

DISPLAY DEVICE

CROSS-REFERENCE TO RELATED APPLICATION

This application claims priority from Korean Patent Application No. 10-2007-0131244, filed on Dec. 14, 2007 in the Korean Intellectual Property Office, the disclosure of which is incorporated herein by reference in its entirety.

BACKGROUND OF THE INVENTION

1. Technical Field

The present invention relates to a display device.

2. Discussion of the Related Art

Liquid crystal displays (LCDs) have been widely used due to their improved performance over conventional displays, and their small size and light weight.

In the liquid crystal display, transmittance of light is determined by an alignment state of a liquid crystal layer. Since the light transmittance depends on physical movement of the liquid crystal layer, low response speed may occur in liquid crystal displays.

Recently, a blue phase liquid crystal, the respond speed of which is approximately 3 μs, has been developed. Since an operation temperature range of the blue phase liquid crystal is very narrow, a monomer is added and polymerized to stabilize a crystal structure of the blue phase liquid crystal.

However, in the display device using the blue phase liquid crystal described above, a driving voltage is relatively high, and the light transmittance is low.

SUMMARY OF THE INVENTION

A display device, in accordance with an embodiment of the present invention, includes a first substrate, a second substrate disposed to face the first substrate, a liquid crystal layer disposed between the first substrate and the second substrate, a first electrode and a second electrode formed on the first substrate, and a protrusion disposed under one of the first electrode and the second electrode, wherein the liquid crystal layer has an isotropic state when there is no applied electric field, and an anisotropic state when an electric field is applied.

The height of the protrusion may be more than about ⅙ of an average distance between the first substrate and the second substrate.

The distance between the first substrate and the second substrate may be more than about 4.5 μm.

The protrusion may have a width of approximately 1 μm to approximately 10 μm.

An electric field may be generated between the first electrode and the second electrode, and the electric field is a horizontal electric field which is substantially parallel with the first substrate and the second electrode.

The liquid crystal layer may include a cross-linked blue phase liquid crystal.

The liquid crystal layer may further include a cured polymer.

The first electrode and the second electrode may each have a width of about 1 μm to about 10 μm.

The first electrode and the second electrode may be respectively disposed to have a distance of approximately 3 μm to approximately 6 μm between them.

The first electrode and the second electrode may respectively have each slit pattern.

The first electrode and the second electrode may include portions that interlock with each other. At this time, the first electrode and the second electrode may be each formed in a fan rib shape The display device may further include a first thin film transistor formed on the first substrate, and connected with the first electrode, and a second thin film transistor formed on the first substrate, and connected with the second electrode.

The display device may further include a plurality of gate lines formed on the first substrate, wherein the first thin film transistor and the second thin film transistor may be connected with the same gate line.

The display device may further include a plurality of data lines formed on the first substrate, wherein the first thin film transistor and the second thin film transistor may be connected with different data lines.

The protrusion may be formed of an organic material.

A cross sectional shape of the protrusion may comprise at least one of a semicircular shape and a half oval shape.

A cross sectional shape of the protrusion may include at least one of a triangular shape, a rhombus shape and other polygonal shape.

The height of the protrusion may be substantially the same as the distance between the first substrate and the second substrate.

The area of a surface of the protrusion which faces the first substrate may be larger than the area of a surface of the protrusion which faces the second substrate, and a cross sectional shape of the protrusion may comprise a rhombus shape.

The display device may further include a sub electrode formed on the second substrate to face the first electrode or the second electrode under which the protrusion is not disposed.

The sub electrode may be applied with the same voltage as a voltage applied to the first or second electrode facing the sub electrode.

The display device may further include a buried electrode disposed under and insulated from the first electrode and the second electrode.

The buried electrode may be applied with substantially the same voltage as a voltage which is applied to one of the first electrode and the second electrode.

A display device, in accordance with an embodiment of the present invention, includes a first substrate, a second substrate disposed to face the first substrate, a liquid crystal layer disposed between the first substrate and the second substrate, a first electrode and a second electrode formed on the first substrate, and a protrusion disposed under one of the first electrode and the second electrode, wherein the liquid crystal layer comprises a cross-linked blue phase liquid crystal.

BRIEF DESCRIPTION OF THE DRAWINGS

Embodiments of the present invention can be understood in more detail from the following description of the exemplary embodiments, taken in conjunction with the accompanying drawings, in which.

DETAILED DESCRIPTION OF EXEMPLARY EMBODIMENTS OF THE INVENTION

Figure 1:
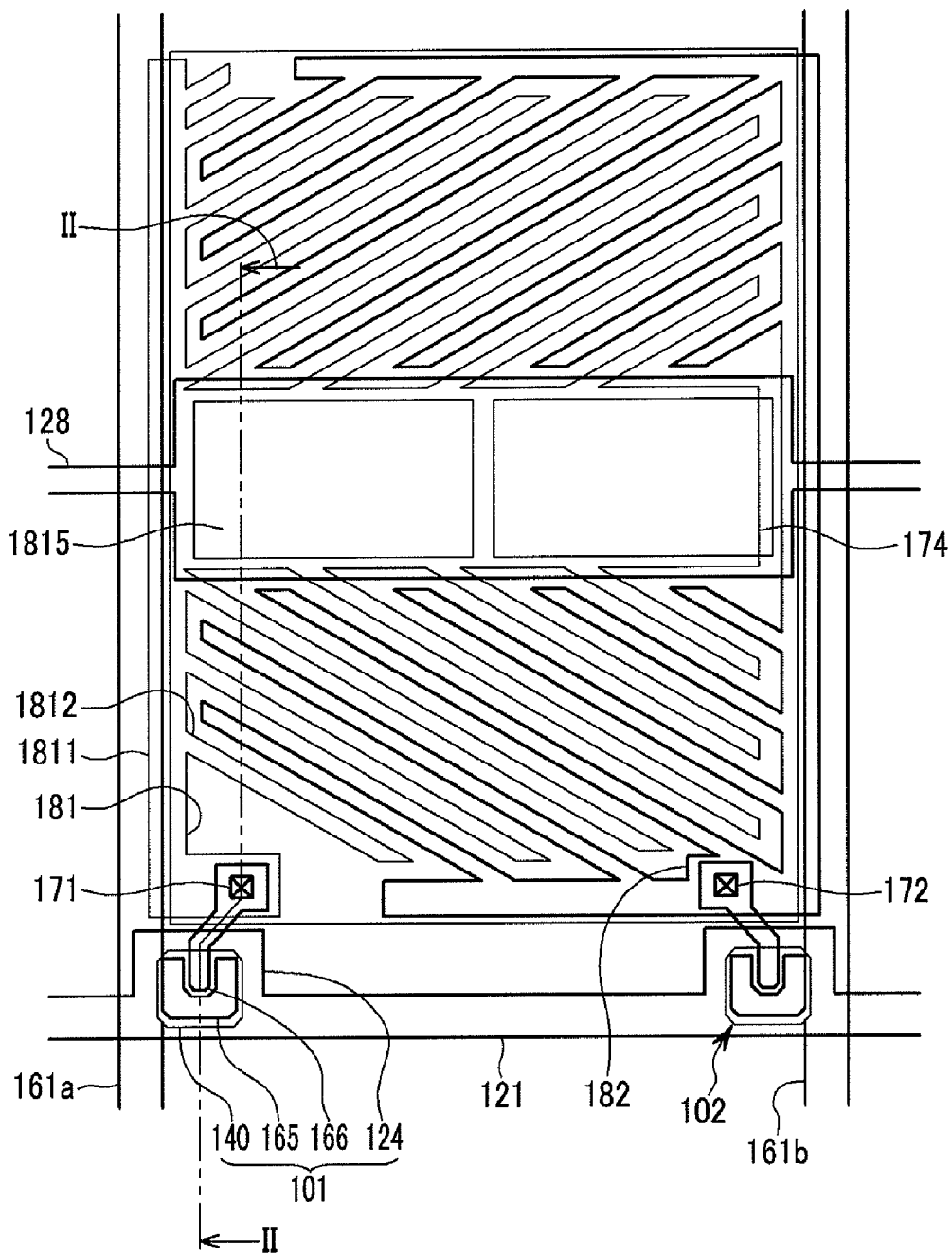
FIG. 1 is a layout view of a display device according to an exemplary embodiment of the present invention.

Reference will now be made in detail to embodiments of the present invention, examples of which are illustrated in the accompanying drawings, wherein like reference numerals may refer to like elements. The present invention may, however, be embodied in many different forms and should not be construed as limited to the embodiments set forth herein.

In the accompanying drawings, thickness may be enlarged to clearly illustrate various layers and areas. When a first unit such as a layer, an area, a substrate, etc. is described as 'on' a second unit, this may mean that the first unit is provided directly on the second unit, or that a third unit is provided therebetween. Referring to the accompanying drawings, a display device using an amorphous silicon (a-Si) thin film transistor (TFT) formed by a five mask process is illustrated. Also, referring to the accompanying drawings, two thin film transistors are used in a single pixel. However, the embodiments of the present invention are not limited thereto.

An exemplary embodiment of the present invention will be described by referring to FIGS. 1 and 2. FIG. 1 is a layout view of a display device 901 according to an exemplary embodiment of the present invention, and FIG. 2 is a sectional view taken along line II-II in FIG. 1.

Figure 2:
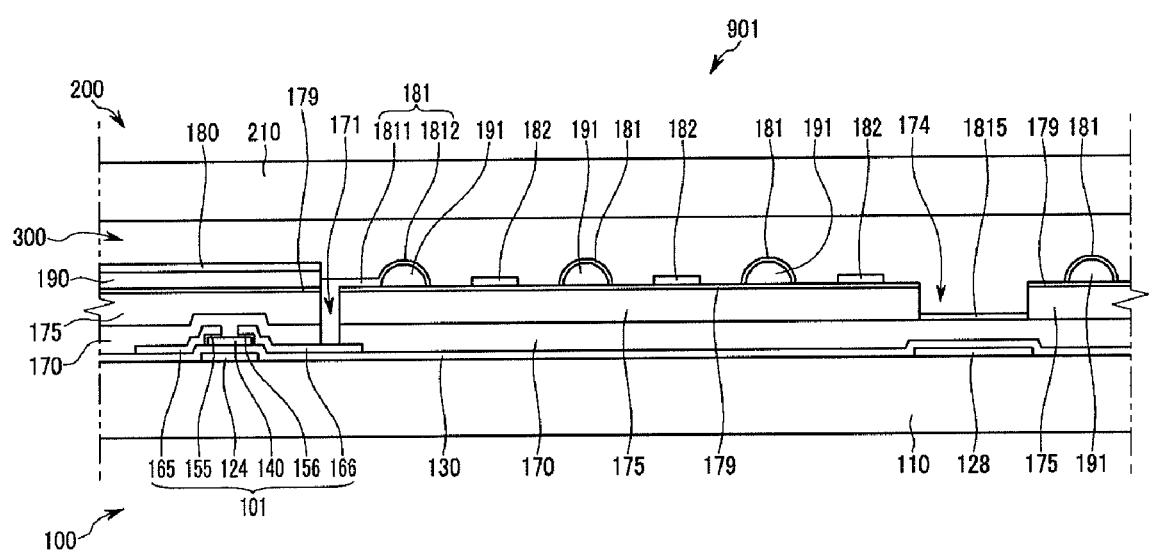
FIG. 2 is a sectional view taken along line II-II in FIG. 1.

As shown in FIGS. 1 and 2, the display device 901 includes a first display substrate 100, a second display substrate 200, and a liquid crystal layer 300.

The first display substrate 100 includes a first substrate 110, first electrodes 181 formed on the first substrate 110, second electrodes 182 formed on the first substrate 110 and distanced from the first electrodes 181, and protrusions 191 disposed under the first electrodes 181 or the second electrodes 182.

In FIGS. 1 and 2, the protrusions 191 are disposed under the first electrodes 181. However, the embodiments of the present invention are not limited thereto. Alternatively, the protrusions 191 may be disposed under the second electrodes 182.

Also, the liquid crystal layer 300 includes a cross-linked blue phase liquid crystal. The blue phase is one of a liquid crystal phase appearing in a temperature range of a few K (absolute temperature) between a cholesteric phase and an isotropic phase.

When using the blue phase liquid crystal, alignment layers on the first substrate 110 and the second substrate 210 may be omitted. The blue phase liquid crystal is optically in an isotropic state when voltage is not applied, and a director aligned in an electric field direction increases to have a refractive anisotropy to change an inputted polarization state when the applied voltage increases.

When using the blue phase liquid crystal, the display device 901 is in a normally black mode. That is, the display device 901 displays black when the voltage is not applied.

Since an operation temperature range of the blue phase liquid crystal is not wide, a monomer of non liquid crystal is added to a low molecular weight liquid crystal which is capable of expressing the blue phase, and an ultraviolet ray is applied to the monomer to be polymerized. When polymerized, a crystal structure is stabilized so that the cross-linked blue phase liquid crystal can be manufactured. The cross-linked blue phase liquid crystal is a type in which a network of polymers is formed among a low molecular weight liquid crystal.

As an alignment varies depending on horizontal electric fields (in plane switching) formed by the first electrodes 181 and the second electrodes 182, the liquid crystal layer 300 adjusts transmittance.

The monomer of the non liquid crystal is a substance polymerizable by heat or an ultraviolet ray, and an acrylate series monomer may be exemplarily used. Alternatively, as the monomer of the non liquid crystal, substances including a polymerizable group, such as a vinyl group, an acryloyl group, a fumarate group, etc. may be used. Also, as necessary, an initiator initiating polymerization of a cross-linking agent and the monomer may be used. As the initiator, acetophenone, benzophenone, etc. may be used. Also, a chiral dopant for expressing a chiral nematic phase may be added to the liquid crystal layer 300.

As the low molecular weight liquid crystal, a substance which is capable of expressing the blue phase between the cholesteric phase (chiral nematic phase) and the isotropic phase is used. The low molecular weight liquid crystal includes a molecular structure such as biphenyl, cyclohexyl, etc., and may have chirality itself, or use a substance expressing the cholesteric phase by adding the chiral dopant.

The blue phase liquid crystal used in the display device 901 according to the present exemplary embodiment will be described in more detail by referring to FIGS. 3 and 4.

Figure 3:
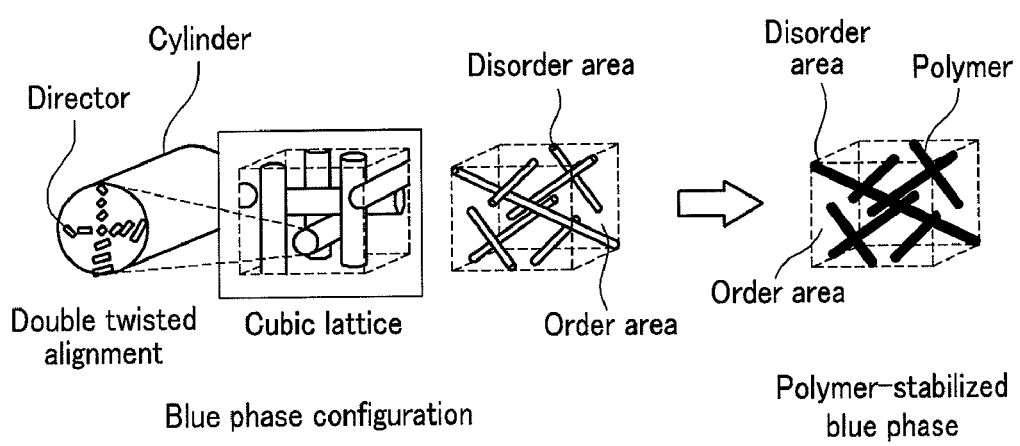
FIG. 3 illustrates a process of stabilizing a blue phase liquid crystal, according to an exemplary embodiment of the present invention.

As shown in FIG. 3, when a chiral phase is induced in a positive liquid crystal, and the blue phase is formed at approximately 1K range, a light curable polymer is formed to stabilize the blue phase up to a normal temperature range so that the blue phase liquid crystal can be manufactured.

Since the blue phase stabilized in a wider temperature range due to the addition of the polymer has a larger Kerr constant, the blue phase is capable of a gray scale expression when an electric field is applied, and has an optical isotropy when there is no voltage application.

Figure 4:
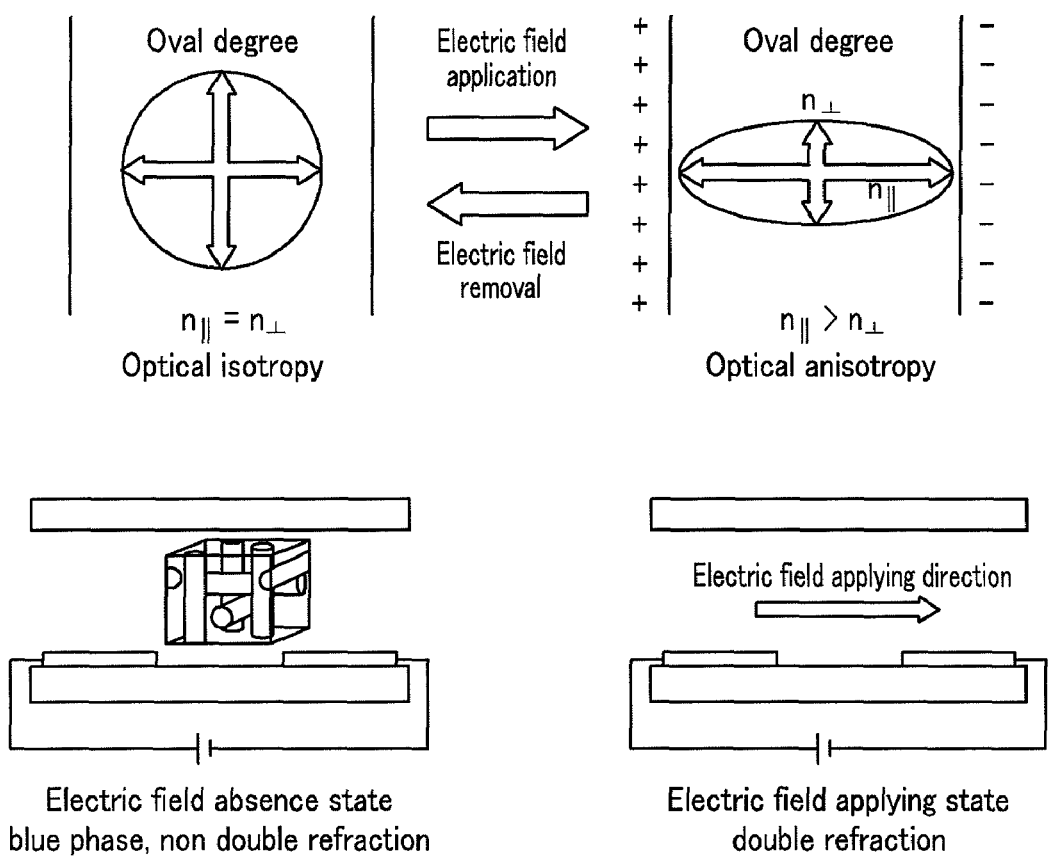
FIG. 4 illustrates a property of liquid crystal varying depending on an electric field application to the blue phase liquid crystal, according to an exemplary embodiment of the present invention.

As shown in FIG. 4, the blue phase liquid crystal has optical isotropy, expresses the blue phase, and does not have double refraction when there is no voltage application. When the voltage is applied, the blue phase liquid crystal has optical isotropy and double refraction. The electric field applied to the blue phase liquid crystal is applied in a horizontal direction, that is, in direction crossing a direction of light transmitting through the liquid crystal layer 300.

Also, a chiral pitch of the blue phase liquid crystal used in the display device according to the present exemplary embodiment may be less than about 300 μm, and for example, may be approximately 200 μm. As a result, the chiral pitch of the blue phase liquid crystal may be prevented from overlapping a wavelength area of a visible ray. Since the wavelength area of the visible ray is approximately 350 μm to 650 μm, the chiral pitch of the blue phase liquid crystal may be less than 300 μm.

Also, the blue phase liquid crystal has a large dielectric constant and refractive index, and has a nematic state.

The first display substrate 100 further includes a plurality of gate lines 121 formed on the first substrate 110, a plurality of data lines 161a and 161b and a plurality of thin film transistors 101 and 102. Also, the first display substrate 100 further includes color filters 175.

The thin film transistors 101 and 102 are disposed in a single pixel. That is, the single pixel includes a first thin film transistor 101 and a second thin film transistor 102. The first thin film transistor 101 is electrically connected with the first electrode 181, and the second thin film transistor 102 is electrically connected with the second electrode 182. The first thin film transistor 101 and the second thin film transistor 102 are connected with the same gate line 121. Also, the first thin film transistor 101 and the second thin film transistor 102 are respectively connected with different data lines 161a and 161b. Different voltages are applied to the first electrode 181 and the second electrode 182, and a horizontal electric field is generated between the first electrode 181 and the second electrode 182. Accordingly, the blue phase liquid crystal of the liquid crystal layer 300 is moved by the electric field generated between the first electrode 181 and the second electrode 182.

The first electrode 181 and the second electrode 182 respectively have a slit pattern, and may be formed to have a fan rib shape so that the first and second electrodes 181 and 182 interlock with each other as shown in FIG. 1. Since the protrusions 191 are disposed under the first electrodes 181, the horizontal electric field is efficiently formed between the first electrodes 181 and the second electrodes 182. That is, the second electrodes 182 are formed to be planar, but the first electrodes 181 are formed to have a shape having a height instead of a planar shape by the protrusions 191 disposed under the first electrodes 181. The widths of the first electrode 181 and the second electrode 182 are each approximately 1 μm to approximately 10 μm, and the first electrode 181 and the second electrode 182 are respectively disposed to have a distance of approximately 3 μm to approximately 6 μm between the first and second electrodes 181 and 182. The distance between the first electrode 181 and the second electrode 182 may be decreased. However, due to manufacturing constraints and process margin considerations, the distance between the first electrode 181 and the second electrode 182 may be in the range of about 3 μm to about 6 μm.

It may be more difficult to form a minute pattern of the protrusions 191 in comparison with forming the electrodes 181 and 182. Accordingly, the protrusions 191 are disposed under the first electrodes 181 or the second electrodes 182. As a result, the distance between the electrodes 181 and 182 can be appropriately maintained, and concurrently, the horizontal electric field can be efficiently formed between the first electrode 181 and the second electrode 182 by means of the protrusion 191.

In order to achieve a positive effect on light transmittance, the distance between the first electrode 181 and the second electrode 182 can be larger than the widths of the first electrode 181 and the second electrode 182. To decrease a driving voltage, the distance between the first electrode 181 and the second electrode 182 can be less than the widths of the first electrode 181 and the second electrode 182. According to an embodiment of the present invention, the widths of the first electrode 181 and the second electrode 182 are smaller than or the same as the distance between the first electrode 181 and the second electrode 182. However, the embodiments of the present invention are not limited thereto. Alternatively, the widths of the first electrode 181 and the second electrode 182 may be larger than the distance between the first electrode 181 and the second electrode 182.

Also, an average distance between the first substrate 110 and the second substrate 210 may be more than about 4.5 μm. The average distance between the first substrate 110 and the second substrate 210 refers to a space substantially between the first substrate 110 and the second electrode 210 filled with the liquid crystal layer 300. For example, the first substrate 110 and the second substrate 210 may un-uniformly have distances between them of about 4 μm to about 12 μm, and a total average distance between the first substrate 110 and the second substrate 210 is more than about 4.5 μm.

Figure 5:
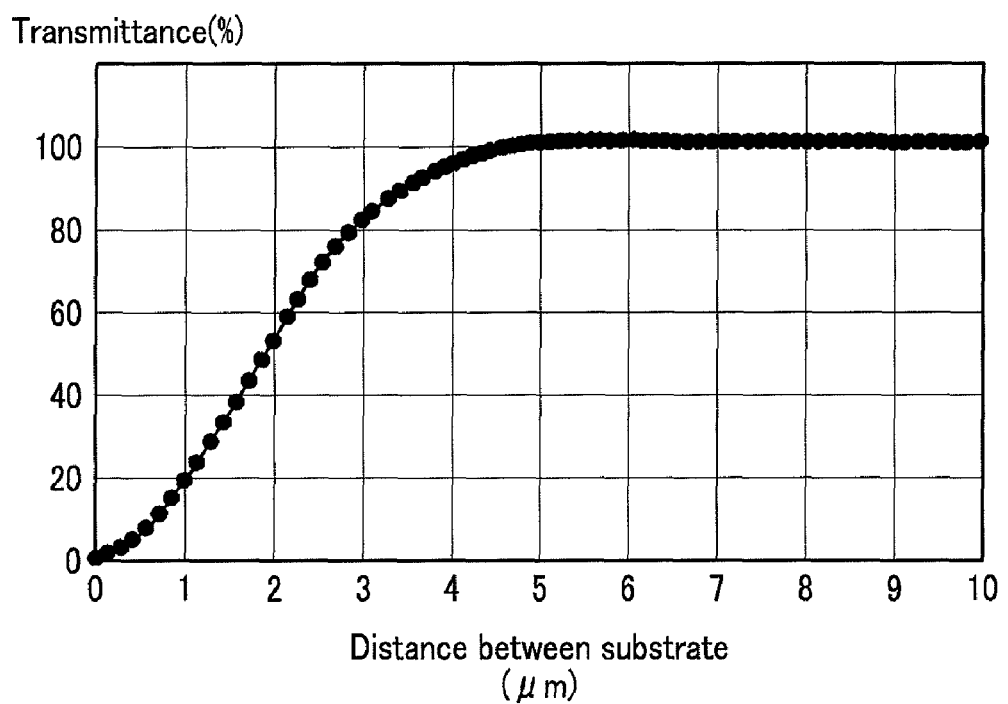
FIG. 5 is a graph illustrating relation between an interval between a first substrate and a second substrate, and transmittance of a light.

FIG. 5 is a graph illustrating a relationship between the distance between the first substrate 110 and the second substrate 210, and the light transmittance.

As shown in FIG. 5, in the display device 901 using the blue phase liquid crystal, when the average distance between the first substrate 110 and the second substrate 210 is more than about 4.5 μm, the light transmittance is showed to be near to about 100%. On the other hand, when the average distance between the first substrate 110 and the second substrate 210 is excessively large, it is difficult to uniformly and stably maintain the distance between the two display substrates 100 and 200. However, in the blue phase liquid crystal, the distance between the first substrate 110 and the second substrate 210 is not required to be uniform.

Also, the protrusion 191 has a height of more than about ⅙ of the average distance between the first substrate 110 and the second substrate 210. For example, when the average distance between the first substrate 110 and the second substrate 210, that is, an average height of the liquid crystal layer 300 filled between the first substrate 110 and the second substrate 210 is about 6 μm, the height of the protrusion 191 is more than about 1 μm. With a consideration of the distance between the two display substrates 100 and 200 generally applied to the display device 901, the protrusion 191 may have the height of about 1 μm to about 6 μm.

Figure 6:
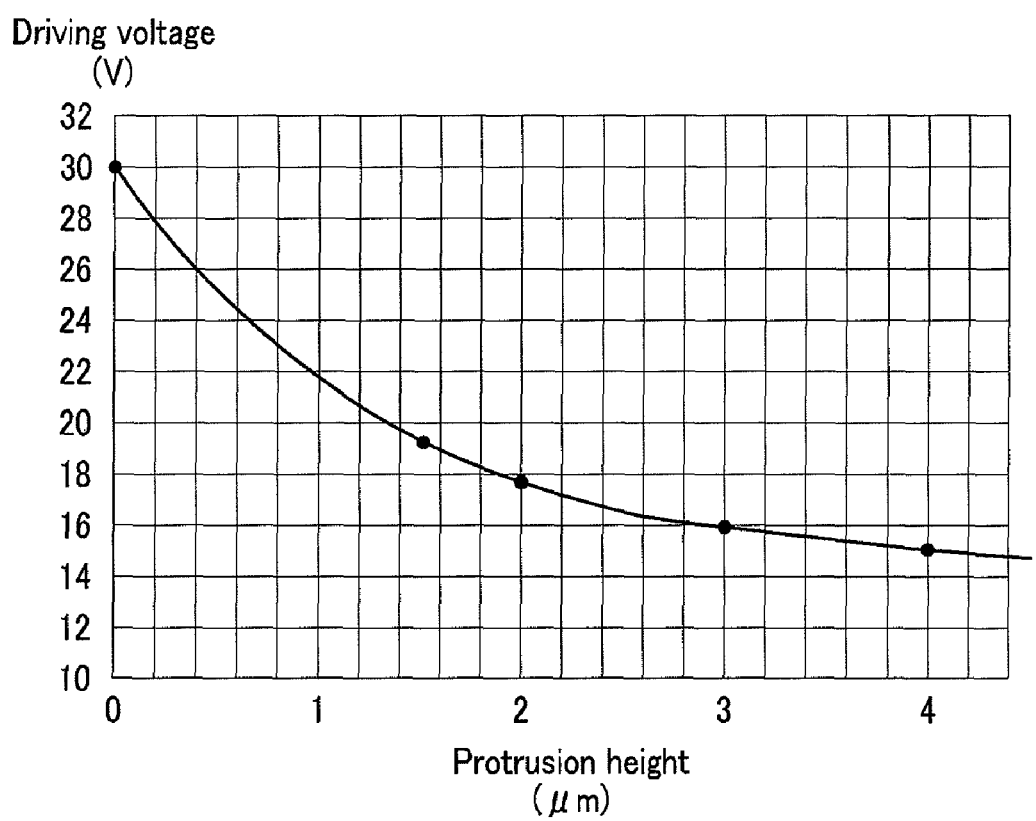
FIG. 6 is a graph illustrating a distribution state of a driving voltage depending on the height of a protrusion.

FIG. 6 illustrates a distribution state of the driving voltage depending on the height of the protrusion 191. As shown in FIG. 6, as the height of the protrusion 191 increases, the driving voltage decreases. As shown in FIG. 6, the decrease in driving voltage is more level when the height of the protrusion 191 is more than ⅙ of the average distance between the first substrate 110 and the second substrate 210, for example, in the range of about 1 μm to about 6 μm.

The configuration of the display device 901 will be described in more detail by referring to FIG. 2.

FIG. 2 illustrates the first thin film transistor 101. The second thin film transistor 102 may have the substantially same configuration as the first thin film transistor 101.

The first substrate 110 includes material such as glass, quartz, ceramic, plastic or the like formed to be transparent.

On the first substrate 110, a plurality of gate lines 121 shown in FIG. 1, a plurality of gate electrodes 124 branched from the gate lines 121, and a plurality of storage electrode line 128 are provided.

A gate wiring including the gate lines 121, the gate electrodes 124, and the storage electrode lines 128 is formed of metal such as Al, Ag, Cr, Ti, Ta, Mo, Cu, etc. or alloy including these.

In FIG. 2, the gate wiring 121, 124 and 128 is illustrated in a single layer. Alternatively, the gate wiring 121, 124 and 128 may be formed of multi layers including a metal layer of Cr, Mo, Ti, Ta, or alloy including these, and a metal layer of Al series or Ag series having a small specific resistance. Alternatively, the gate wiring 121, 124 and 128 may be formed of other various metals or conductive bodies. The multi layers may be capable of being patterned under the same etching condition.

A gate insulating layer 130 formed of silicon nitride SiNx, etc. is formed on the gate wiring 121, 124 and 128.

On the gate insulating layer 130, a data wiring including a plurality of data lines 161a and 161b shown in FIG. 1 crossing the gate lines 121, a plurality of source electrodes 165 branched from the data lines 161a and 161b, and a plurality of drain electrodes 166 distanced from the source electrodes 165 is formed.

Like the gate wiring 121, 124 and 128, the data wiring 161a, 161b, 165 and 166 may be formed of a conductive material such as chrome, molybdenum, aluminum, copper, or alloy including these, etc., and may be formed as a single layer or multi layers.

Also, a semiconductor layer 140 is formed on the gate insulating layer 130 over the gate electrodes 124, and under the source electrodes 165 and the drain electrodes 166. In detail, portions of the semiconductor layer 140 overlaps the gate electrodes 124, the source electrodes 165 and the drain electrodes 166. One gate electrode 124, one source electrode 165 and one drain electrode 166 are three electrodes of the thin film transistor 101. The semiconductor layer 140 between the source electrodes 165 and the drain electrodes 166 is channel areas of the thin film transistors 101.

Also, ohmic contacts 155 and 156 are formed between the semiconductor layer 140, and the source electrodes 165 and the drain electrodes 166 to respectively reduce a contact resistance therebetween. The ohmic contacts 155 and 156 are formed of silicide or amorphous silicon doped with an n-type impurity with high density.

On the data wiring 161a, 161b, 165 and 166, a passivation layer 170 made of a low dielectric insulating material such as a-Si:C:O, a-Si:O:F, etc. formed by a plasma enhanced chemical vapor deposition (PECVD), an inorganic insulating material such as a silicon nitride, silicon oxide, etc., or an organic insulating material is formed.

The color filters 175 having the three primary colors are disposed in sequence on the passivation layer 170. The color of the color filter 175 is not limited to the three primary colors. The color filter 175 provides color to light transmitting in the display device 901.

The color filters 175 are formed on the passivation layer 170. However, the embodiments of the present invention are not limited thereto. Alternatively, the color filters 175 may be formed between the passivation layer 170 and the data wiring 161a, 161b, 165 and 166. Also, the color filter 175 may be formed on the second display substrate 200 instead of the first display substrate 100.

A capping layer 179 is formed on the color filters 175. The capping layer 179 protects the organic layers including the color filters 175. The capping layer 179 may be omitted. The capping layer 179 may be formed of various materials such as an inorganic layer, etc. including material similar to the passivation layer 170.

The protrusions 191 and first protective members 190 are formed on the capping layer 179.

The protrusions 191 are formed on pixel areas and the first protective members 190 are formed on thin film transistor areas.

The protrusions 191 may be formed of a photosensitive organic material by an exposing developing process. However, the embodiments of the present invention are not limited thereto, and the protrusions 191 may be formed of other various materials.

Each protrusion 191 includes a section having a semicircular shape or a half oval shape. Also, the width of the protrusion 191 is about 1 μm to about 10 μm. Also, the width of the protrusion 191 is more than about ⅙ of the average distance between the first substrate 110 and the second substrate 210.

The first electrodes 181 and the second electrodes 182, and second protective members 180 are formed on the protrusions 191 and the capping layer 179.

In FIG. 2, the first electrodes 181 are formed on the protrusions 191, and the second electrodes 182 are formed directly on the capping layer 179. The second protective members 180 are formed on the first protective members 190.

Also, the first electrodes 181 are connected with the first thin film transistors 101, and the second electrodes 182 are connected with the second thin film transistors 102. The first electrodes 181 and the second electrodes 182 are formed of a transparent conductive body such as indium tin oxide (ITO), etc. In more detail, each first electrode 181 includes an electrode unit 1812 formed on the protrusion 191, and a connecting unit 1811 connecting the electrode unit 1812 and the thin film transistor 101. Also, portions of the first electrode 181 or the second electrode 182 are overlapped with the first storage electrode line 128 of the gate wiring to form a storage electric capacity.

Also, the passivation layer 170 and the color filters 175 include a plurality of contact holes 171 and 172 exposing portions of the drain electrodes 166. The first electrodes 181 and the second electrodes 182 are respectively electrically connected with the drain electrodes 166 of the first thin film transistors 101 and the second thin film transistors 102 through the contact holes 171 and 172. Also, the color filters 175 further includes a plurality of opening units 174 formed on the first storage electrode lines 128.

An alignment state of the blue phase liquid crystal of the liquid crystal layer 300 is changed depending on the horizontal electric fields generated between the first electrodes 181 and the second electrodes 182, and accordingly, the light transmittance is adjusted.

The second display substrate 200 includes the second substrate 210. Like the first substrate 110, the second substrate 210 includes glass, quartz, ceramic or the like formed to be transparent.

Alternatively, the second substrate 210 may be formed of plastic to reduce weight and thickness. The plastic may exemplarily include polycarbonate, polyimide, polyethersulfone (PES), polyarylate (PAR), polyethylenenaphthalate (PEN), polyethylene terephthalate (PET), etc.

Also, the first display substrate 100 and the second display substrate 200 are not limited to the above configuration. Alternatively, the embodiments of the present invention may be applied to display devices including various known configurations instead of the configuration of the display device 901 shown in FIGS. 1 and 2.

As described above, the display device 901 according to an exemplary embodiment of the present invention can reduce the driving voltage, or improve the light transmittance. In addition, the thin film transistors are protected by the first and second protective members 180 and 190 formed along with the protrusion 191 and the first and second pixel electrodes 181 and 182.

Figure 7:
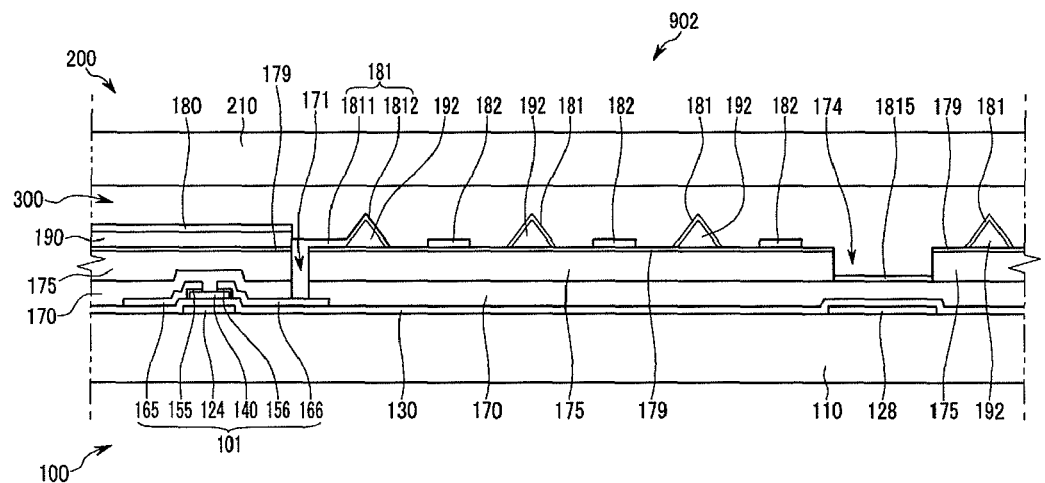
FIG. 7 is a sectional view of a display device according to an exemplary embodiment of the present invention.

Hereinafter, an exemplary embodiment of the present invention will be described by referring to FIG. 7. FIG. 7 is a sectional view of a display device 902 according to an exemplary embodiment of the present invention.

As shown in FIG. 7, the display device 902 includes a plurality of protrusions 192 including a section having a substantially polygonal shape. As side inclination angles of the protrusions 192 increases, that is, sides of the protrusions 192 approach to be vertical, that is, about 90 degrees with respect to a surface of a first substrate 110 and a second substrate 210, horizontal electric fields can be further efficiently generated between first electrodes 110 and second electrodes 210.

Accordingly, the display device 902 according to an exemplary embodiment of the present invention can reduce a driving voltage, or improve transmittance of a light.

Figure 8:
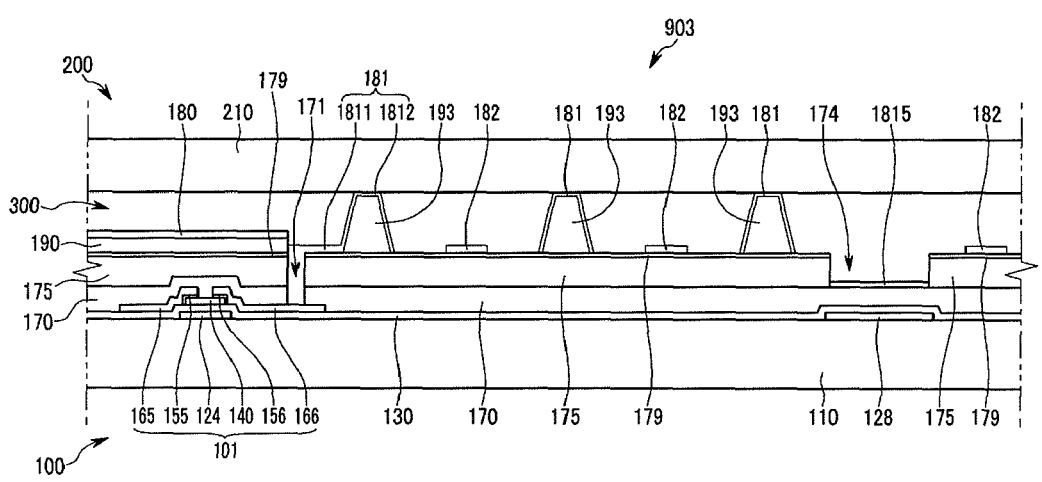
FIG. 8 is a sectional view of a display device according to an exemplary embodiment of the present invention.

An exemplary embodiment of the present invention will be described by referring to FIG. 8. FIG. 8 is a sectional view of a display device 903 according to an exemplary embodiment of the present invention.

As shown in FIG. 8, the height of one protrusion 193 is formed to be substantially the same as an average distance between a first substrate 110 and a second substrate 210. The average distance between the first substrate 110 and the second substrate 210 refers to a space between the first substrate 110 and the second substrate 210 substantially filled with a liquid crystal.

The protrusions 193 are formed between the first substrate 110 and the second substrate 210 as a wall type. Also, the area of a surface of the protrusion 193 facing the substrate 110 is larger than the area of a surface of the protrusion 193 facing the second substrate 210. Also, the protrusion 193 may include a section having a rhombic shape. However, the embodiments of the present invention are not limited thereto. Alternatively, the section of the protrusion 193 may have various shapes such as an oval shape, a polygonal shape including a triangular shape, etc. The sum of the height of the protrusion 193 and the thickness of the first electrode 181 substantially equals the average height of a liquid crystal layer 300 filled between the first substrate 110 and the second substrate 210.

Accordingly, the protrusions 193 are disposed under a first electrodes 181 or a second electrodes 182, or under both the first and second electrodes 181, 182 to help horizontal electric fields to be further efficiently generated between the first electrodes 181 and the second electrodes 182, and stably maintain the distance between the first substrate 110 and the second substrate 210.

Accordingly, the display device 903 according to an exemplary embodiment of the present invention can reduce a driving voltage, or improve transmittance of a light.

Figure 9:
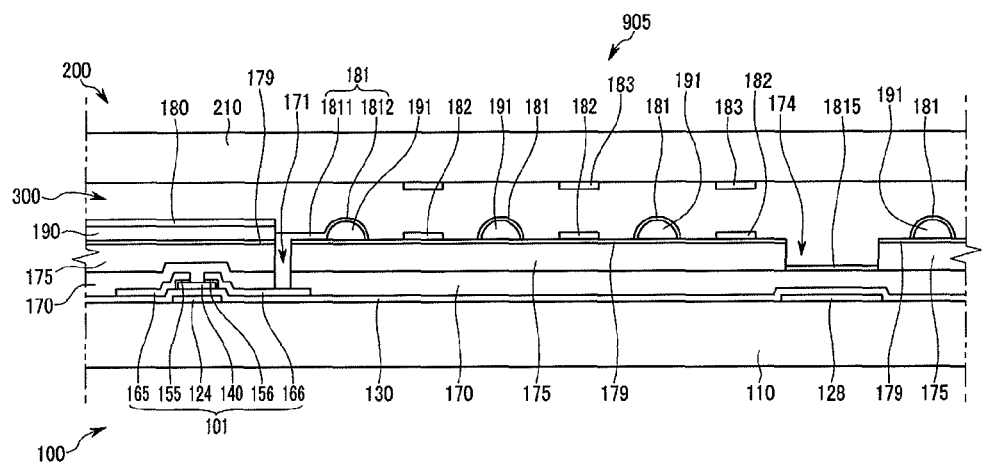
FIG. 9 is a sectional view of a display device according to an exemplary embodiment of the present invention.

An exemplary embodiment of the present invention will be described by referring to FIG. 9. FIG. 9 is a sectional view of a display device 904 according to an exemplary embodiment of the present invention.

As shown in FIG. 9, the display device 904 includes a plurality of protrusions 191 disposed under first electrodes 181 or second electrodes 182. That is, the first electrodes 181 or the second electrodes 182 are formed on the protrusions 191, and the other are formed without the protrusions 191. In FIG. 9, the first electrodes 181 are illustrated to be formed on the protrusions 191, but the embodiments of the present invention are not limited thereto. Alternatively, the second electrodes 182 may be formed on the protrusions 191.

Also, the display device 904 further includes a plurality of sub electrodes 183 formed on the second substrate 210 to face the first electrodes 181 or the second electrodes 182 which are not formed on the protrusions 191. In FIG. 9, the first electrodes 181 are formed on the protrusions 191, and the sub electrodes 183 are disposed to face the second electrodes 182. The sub electrodes 183 are applied with substantially the same voltage as a voltage applied to the second electrodes 182, that is, the electrodes that the sub electrodes 183 face.

Horizontal electric fields are formed between the first electrodes 181 which are formed on the protrusions 191 on the first substrate 110, and the second electrodes 182 which are not formed on the protrusions 191 on the first substrate 110 and the sub electrodes 183 which are disposed to face the second electrodes 182 on the second substrate 210.

Accordingly, the display device 904 according to an exemplary embodiment of the present invention can reduce a driving voltage, or improve transmittance of a light.

Figure 10:
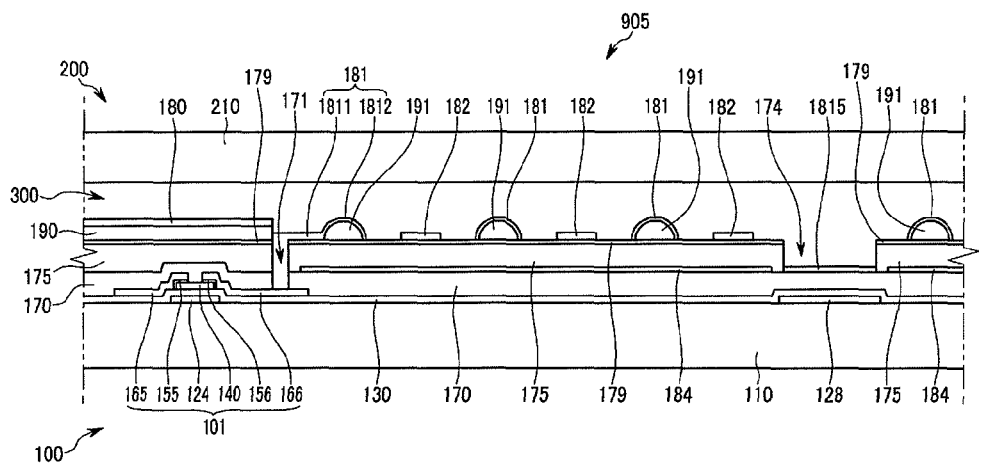
FIG. 10 is a sectional view of a display device according to an exemplary embodiment of the present invention.

An exemplary embodiment of the present invention will be described by referring to FIG. 10. FIG. 10 is a sectional view of a display device 905 according to an exemplary embodiment of the present invention.

As shown in FIG. 10, the display device 905 includes a plurality of protrusions 191 disposed under first electrodes 181 or second electrodes 182. That is, the first electrodes 181 or the second electrodes 182 are formed on the protrusions 191, and the other are formed without the protrusions 191. In FIG. 10, the first electrodes 181 are illustrated to be formed on the protrusions 191, but the embodiments of the present invention are not limited thereto. Alternatively, the second electrodes 182 may be formed on the protrusions 191.

Also, the display device 905 further includes a plurality of buried electrodes 184 disposed to be insulated under the first electrodes 181 and the second electrodes 182. The buried electrodes 184 are applied with substantially the same voltage as a voltage applied to the first electrodes 181 or the second electrodes 182. The buried electrodes 184 help horizontal electric fields to be efficiently generated between the first electrodes 181 and the second electrodes 182.

Accordingly, the display device 905 according an exemplary embodiment of the present invention can reduce a driving voltage, or improve transmittance of a light.

As described above, the embodiments of the present invention provide a display device reducing a driving voltage, and improving transmittance of a light.

Although a few exemplary embodiments of the present invention have been shown and described, it will be appreciated by those skilled in the art that changes may be made in these exemplary embodiments without departing from the principles and spirit of the invention, the scope of which is defined in the appended claims.

What is claimed is:

1. A display device, comprising:
   a first substrate;
   a second substrate disposed to face the first substrate;
   a liquid crystal layer disposed between the first substrate and the second substrate;
   a first electrode and a second electrode formed on a surface on the first substrate; and
   a protrusion disposed under the first electrode between the surface and the first electrode, wherein the second electrode does not include a protrusion between the surface and the second electrode,
   wherein the liquid crystal layer has an isotropic state when there is no applied electric field, and an anisotropic state when an electric field is applied,
   wherein the first electrode covers a lateral surface and a top surface of the protrusion.

2. The display device of claim 1, wherein the height of the protrusion is more than about ⅙ of an average distance between the first substrate and the second substrate.

3. The display device of claim 2, wherein the distance between the first substrate and the second substrate is more than about 4.5 μm.

4. The display device of claim 2, wherein the protrusion has a width of approximately 1 μm to approximately 10 μm.

5. The display device of claim 3, wherein an electric field is generated between the first electrode and the second electrode, and the electric field is a horizontal electric field which is substantially parallel with the first substrate.

6. The display device of claim 5, wherein the liquid crystal layer comprises a cross-linked blue phase liquid crystal.

7. The display device of claim 6, wherein the liquid crystal layer further comprises a cured polymer.

8. The display device of claim 2, wherein the first electrode and the second electrode each have a width of about 1 µm to about 10 µm.

9. The display device of claim 8, wherein the first electrode and the second electrode are respectively disposed at a distance of approximately 3 µm to approximately 6 µm from each other.

10. The display device of claim 9, wherein the first electrode and the second electrode each have a slit pattern.

11. The display device of claim 10, wherein the first electrode and the second electrode comprise portions that interlock with each other.

12. The display device of claim 11, wherein the first and second electrodes are each formed in a fan rib shape.

13. The display device of claim 2, further comprising a first thin film transistor formed on the first substrate, and connected with the first electrode, and
a second thin film transistor formed on the first substrate, and connected with the second electrode.

14. The display device of claim 13, further comprising a plurality of gate lines formed on the first substrate,
wherein the first thin film transistor and the second thin film transistor are connected with the same gate line.

15. The display device of claim 13, further comprising a plurality of data lines formed on the first substrate,
wherein the first thin film transistor and the second thin film transistor are connected with different data lines.

16. The display device of claim 2, wherein the protrusion is formed of an organic material.

17. The display device of claim 2, wherein a cross sectional shape of the protrusion comprises at least one of a semicircular shape and a half oval shape.

18. The display device of claim 2, wherein a cross sectional shape of the protrusion comprises at least one of a triangular shape, a rhombus shape and other polygonal shape.

19. The display device of claim 2, wherein the height of the protrusion is substantially the same as the distance between the first substrate and the second substrate.

20. The display device of claim 19, wherein the area of a surface of the protrusion which faces the first substrate is larger than the area of a surface of the protrusion which faces the second substrate.

21. The display device of claim 20, wherein a cross sectional shape of the protrusion comprises a rhombus shape.

22. The display device of claim 1, further comprising a sub electrode formed on the second substrate to face one of the first electrode or the second electrode, not both of the first and second electrodes.

23. The display device of claim 22, wherein the sub electrode is applied with the same voltage as a voltage applied to the first or second electrode facing the sub electrode.

24. The display device of claim 22, further comprising a buried electrode disposed under and insulated from the first electrode and the second electrode.

25. The display device of claim 24, wherein the buried electrode is applied with substantially the same voltage as a voltage which is applied to one of the first electrode and the second electrode.

26. A display device, comprising:
a first substrate;
a second substrate disposed to face the first substrate;
a liquid crystal layer disposed between the first substrate and the second substrate;
a first electrode and a second electrode formed on a surface on the first substrate; and
a protrusion disposed under the first electrode between the surface and the first electrode, wherein the second electrode does not include a protrusion between the surface and the second electrode,
wherein the liquid crystal layer comprises a cross-linked blue phase liquid crystal,
wherein the protrusion forms a height difference between the first electrode and the second electrode.

* * * * *